June 25, 1946.       A. B. SCHULTZ ET AL       2,402,919
HOOK AND HOOK RETAINER ASSEMBLY
Filed April 16, 1943           2 Sheets-Sheet 1
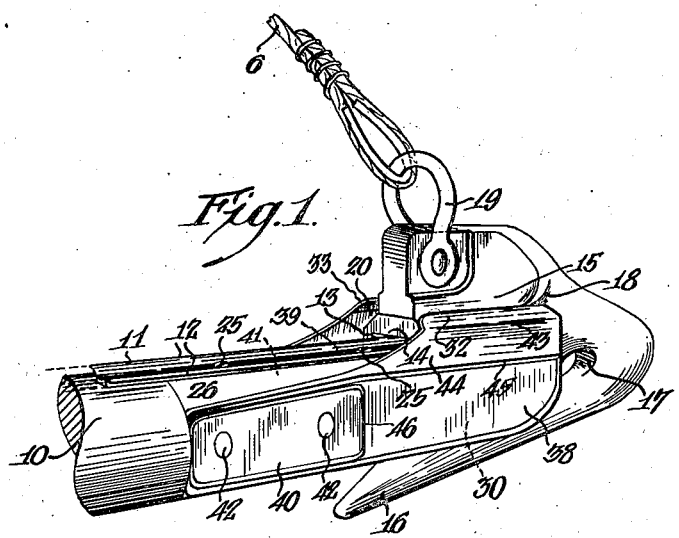
Inventors.
Arthur B. Schultz and
William B. Burkhart
by
Wm Steell Jackson and Son
Attorneys.
Witnesses:

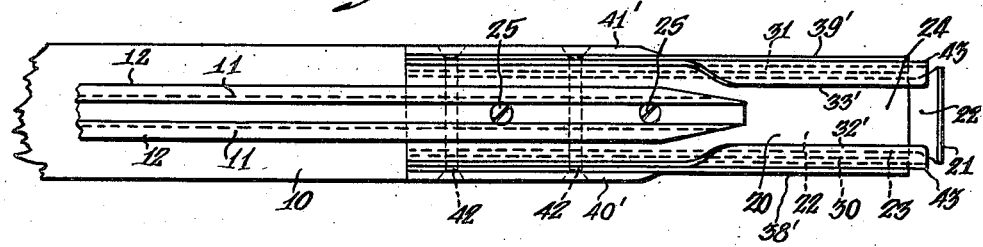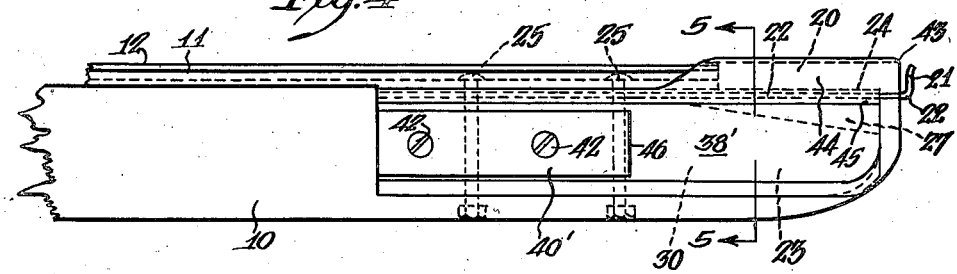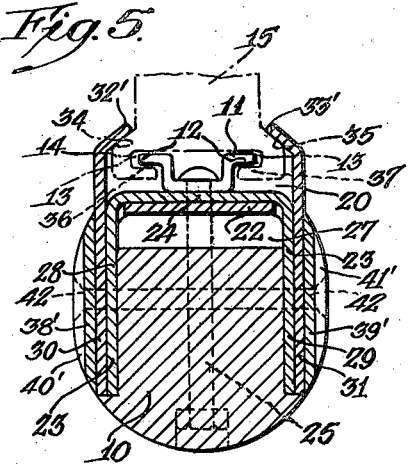

Patented June 25, 1946

2,402,919

UNITED STATES PATENT OFFICE 2,402,919

HOOK AND HOOK RETAINER ASSEMBLY

Arthur B. Schultz, Wilmington, Del., and William B. Burkhart, Martinsburg, W. Va., assignors to All American Aviation, Inc., Wilmington, Del., a corporation of Delaware Application April 16, 1943, Serial No. 483,238

15 Claims. (Cl. 258—1.2)

Our invention relates to arms depending from aircraft by which pick-up hooks are temporarily positioned to engage loops or other lines attached to objects to be picked up or towed. The invention relates also to the hooks in so far as they cooperate with these arms. The loads to be picked up or launched range from mail and cargo containers to gliders and full-powered aircraft of both land and sea types.

Whatever the size or character of the load the general procedure in establishing connection with it is much the same. A hook permanently attached to the line or cable is carried at the tip of an arm depending from the towing aircraft or tug.

Although the arm may be raised and lowered, the tip of the arm is ordinarily inaccessible from a point within the aircraft. It is, therefore, necessary to provide means accessible within the aircraft for positioning the hook at the tip of the arm. This is accomplished by a length of track attached to the trailing edge of the arm, over which track the hook is fitted and then allowed to slide down due to the force of gravity.

A pick-up loop or other line connected with the load is disposed within the path of travel of the aircraft so that after the loop has been struck by the arm, the loop slides down along the forward surface of the arm until it engages the hook. The hook is instantly disconnected from the arm and the force of contact is transmitted to the towing craft through the cable attached to the hook and a shock-absorbing winch mounted in the tug (towing craft).

The energy required to accelerate the winch and the load up to full towing speed is absorbed partially by the material used in the line and loop and partially by suitable braking devices in the winch.

In any event, after the hook is pulled free from the arm the hook is carried wholly by the towing connection and the function of the present invention has been fully performed.

We are familiar with the invention disclosed in the United States patent application, Air pick-up system, Serial Number 423,999, filed December 22, 1941 by Stuart Crosby Plummer, now Patent No. 2,373,414, dated April 10, 1945.

Heretofore the devices used for positioning a pick-up hook at the tip of the arm have proved to be most unsatisfactory and unreliable due to the exacting requirements of this small but extremely important part of air pick-up equipment.

Hooks frequently became prematurely disengaged from the tip of the arm causing serious damage and preventing a successful connection. Hooks were often knocked loose from the tip of the arm by the force of the blow when the arm struck the loop. The track was sometimes damaged and arms were broken because the hook failed to slide all the way down to the tip.

Since the direction of force tending to remove the hook from the arm varies with each pick-up operation, it frequently occurred that the retaining device was damaged, necessitating a landing for repairs before another pick-up could be attempted.

A main object of our invention is to support a hook in a predetermined position so that it may reliably engage a pick-up loop and line and at the same instant be released from the predetermined position.

Another object of our invention is to provide a structure which positively positions a pick-up hook.

Another object of our invention is to provide a structure which permits a pick-up hook to be retracted in the same manner in which it was lowered.

Another object of our invention is to provide a structure which will not release the hook until the hook has engaged a pick-up loop.

Still a further object of our invention is to provide a pocket formed of spring-like members permitting the hook to attain its releasing position through the force of gravity and permitting it to be withdrawn therefrom when the withdrawing force is applied from any of a wide range of directions.

Further objects will appear in the specifications and in the claims.

In the drawings,

Figure 1 is a perspective view of the end of a loop engaging arm with a hook in normal resiliently supported position ready for pick-up of a tow loop and for withdrawal of the hook from the arm under stress.

Figure 2 is a perspective view of the same structure seen in Figure 1 but showing the hook about to enter the hook retaining mechanism.

Figure 3 is a plan view of an arm similar to that seen in Figures 1 and 2 but without the hook and showing slightly different detail of plate construction.

Figure 4 is a side elevation of the structure seen in Figure 3.

Figure 5 is an enlarged transverse section of Figure 4 taken on line 5—5.

Figure 6 is a diagrammatic perspective view of an aircraft having a pick-up arm, and of a pick-up loop in one position of use.

Figures 6ª and 6ᵇ are fragmentary views of the arm and loop of Figure 6 in successive pick-up positions.

In the drawings similar numerals indicate like parts.

In Figures 1, 2, 3, 4 and 5 the effort to display the details of arm construction to best advantage has led to illustration of the arm in a different position from that which it normally occupies when in use. The arm in its non-operating or retracted position is substantially horizontal as shown in Figures 1 to 5. The normal operating position, however, illustrated in Figure 6, is usually about 45° from the center line of the airplane.

Figure 6 also locates the arm with respect to the aircraft by which it is carried, and with respect to the loop which is picked up and the other parts with which the arm and loop are associated.

The invention has to do primarily with features of a pick-up system in which an aircraft 5 in flight carries a towing line or cable 6 upon a drum or winch 7. The aircraft picks up a loop or line 8 which is transversely disposed upon poles or other supports 9 so that the loop or line extends across the path of travel of a depending pick-up arm 10. The arm temporarily supports a hook more fully described in connection with Figures 1 to 5, which hook is attached to the end of the cable.

The arm guides the loop into the hook and the impact of the arm against the loop separates the loop from the supports and at the same time pulls the hook from the arm. The cable may be payed out from the drum or winch against a resistance and subsequently is reeled back upon the drum 7.

The parts, aircraft, drum or winch, cable, pick-up loop or line and poles are all intended to be conventional in Figure 6 and are shown for the purpose only of indicating a general pick-up practice and scheme into which the arm and hook of the present invention fit and may be made to play a part.

The arm 10, which is preferably constructed of wood, carries a track 11 secured to its upper or trailing edge and terminating at a point near to the tip of the arm. The track 11 has oppositely disposed flanges 12 which engage within grooves 13 of a slider 14 attached to the hook 15.

The hook terminates in a tip 16 which engages the pick-up loop or line 8 as the loop slides down the forward or leading edge of the arm 10, and directs this line into a hook recess 17.

The tip of the hook is connected through shank 18 to the line or cable 6 fastened to clevis 19. In normal operation the cable is wound upon any such drum as that shown in Figure 6 within an aircraft which at the time of pick-up is in flight.

At the time of contact, the leading edge of the arm strikes the pick-up loop or line causing the latter to slide downwardly along the arm until the loop has been engaged by the hook. The same force in turn pulls the hook entirely free from the tip of the arm and permits the tension caused by the weight of the load to be transmitted through the shank 18 of the hook, clevis 19 and cable 6 to the drum on the aircraft.

At the tip of the arm there is located a hook retainer recess 20 for the slider. The end wall 21 of the recess is formed from a spring steel clip 22 a portion of which is turned to form a yielding spring wall. The end wall restrains withdrawal of the hook slider in the direction of the length of the arm.

Over the spring clip 22, limiting the movement of the clip and forming one wall of the recess is a sheath or channel 23 shown as of inverted U-shape. It encloses the clip. The end of the track, the end of the spring clip and the portion 24 of the channel may be secured to the arm by the same fastenings 25. This end of the channel is shown as re-enforcing the arm at 26.

The extreme tip of the arm is cut away at 27 beneath the clip allowing the clip to be depressed by the slider thus permitting withdrawal of the hook in a direction parallel with the center line of the arm.

The sides of the channel appear at 28 and 29 in Figures 2 and 5 and embrace the end of the arm. They lie between spring side plates 30 and 31 whose edges are inwardly turned to form spring guides or lips 32 and 33 to receive the thrust of or to be engaged by the outwardly facing shoulders 34 and 35 of the slider.

To enable the slider to cooperate with the track it has a T-slot shown as made up by grooves 13 and formed by inwardly directed flanges 36 and 37. The slider therefore carries not only grooves to receive and be guided by the flanges of the track but also exterior shoulders which engage or are engaged by the lips 32 and 33 or, in other figures, 32' and 33'. The slider thus follows the flanges of the track down to the place where the flanges of the track end and there is received by the recess and is restrained by the lips of the spring side plates. Backing plates 38 and 39 provide additional strength and resilience and re-enforcing plates 40 and 41 serve to maintain correct tension and alignment. Side plates 30 and 31, backing plates 38 and 39 and re-enforcing plates 40 and 41, all are secured to the arm by bolts 42.

In preparing the hook for a pick-up, the operator starts the slider with hook attached, on the track at a point near the upper end of the track and gradually pays out cable, allowing the hook to slide down the track until it nears the tip of the arm. At a short distance from the tip of the arm the track terminates and the slider consequently leaves the track entirely and drops into the recess 20 formed by side plates 30 and 31. The overhanging lips 32 and 33, and the flared lip 21 prevent the hook and slider from passing on through the recess and off the end of the arm.

The hook rides in this position (Figure 6) until it engages the loop. As soon as this occurs the hook and slider are forcibly jerked out of the recess 20.

It will be understood that the lips 32, 33 and 21 must permit the hook readily to be withdrawn, no matter whether the thrust comes from a downward, diagonally downward, or a backward direction. The slider and the hook when in the position relative to the arm of Figure 1, fit loosely in the recess, so that the hook when sliding down the track under its own weight drops completely off of the track and into the recess.

The spring steel clip 22 (Figure 6) readily yields downward when pressure is exerted upon it. In like manner the side plates 30 and 31 constructed of spring steel and secured by the bolts at a point somewhat removed from the recess yield readily in a transverse direction when diagonal or backward force is exerted upon them through the outer faces 34 and 35 of the slider.

The lips may bend at the lines 43 and at the junctions 44 of the lips with the side plates or at the edges 45 of the re-enforcing plates, and the spring side plates bend bodily about the edges 46 of the stiffening plates.

In Figures 3 and 4 as compared with Figures 1 and 2 there are trifling differences in shape, proportion and position of the several resilient plates and stiffeners, by reason of which these parts have been given primed numbers.

When the slider carrying the hook is released from the rather rigid guidance by the flanges of the track, its guidance is taken over by the lips 32 and 33. These lips conform to the shape of the shoulders 34 and 35 and yield torsionally and the side plates yield laterally and bend torsionally so that control of the slider transfers from a stiff guide to a loosely fitting pocket of spring members yielding in any direction from which it is possible for the hook to be pulled out.

The extent of side movement and torsional movement depend upon the clearance provided between the several faces of the slider and the walls of the pocket. This clearance should be ample to allow the slider to fall freely into the pocket and at the same time maintain correct alignment of the tip of the hook as well as prevent premature disengagement.

The additional spring stiffening given to the side plates by supplemental spring plates 38 and 39 preferably is added to the side plates at a distance from the tip and from the lips. This increases the torsional movement which may be permitted as compared with the side movement of the parts of the side plates adjacent to the lips. The side plates in their entirety are resiliently held against movement away from each other not only because of their own resistance but because of the reinforcing plates 38 and 39, all held in place by the stiffening plates 40, 41, and screws 42.

As a result of the spring supports, and particularly because of the character and position of the springs, the effect is to permit release of the hook and slider in variant directions.

The longitudinal, lateral, and torsional spring support given allow the slider and hence hook to be drawn out directly lengthwise with respect to the length of the arm, or diagonally or even torsionally with respect to the arm. As a result, the path of withdrawal closely follows the line of stress and may be an intermediate path, yielding to a combination of stresses in the different directions indicated.

In operation, when the hook and slider move downwardly along the track upon the arm, the slider holds to the track until it gets to a point where its shoulders pass under the lips 32 and 33. During its movement beneath them it frees from the track flanges so that in its lowermost (normal holding) position it has lost the lateral restraint of the track and is controlled in lateral movement, wholly by the spring side plates and the lips. The slider comes to rest against the outwardly turned spring clip terminal.

The only outside stress brought upon the hook is due to air drag on the cable until the hook has engaged and picked up the loop or line so as to subject the hook to a sudden and considerable pull.

At or about the time when the hook is subjected to the first sudden yank the slider is pulled out of the pocket in which it has been supported. Because the direction of the stress upon the slider varies with the position and direction of movement of the pick-up aircraft with respect to the load, the direction in which the slider is pulled will vary greatly with individual pick-ups making great flexibility of support desirable and using to the full the flexibility provided by the great resilience of support described.

It will be evident that the channel, partially fitting the contour of the arm, forms an excellent stiffener for the construction, holding the parts together and improving the construction as well as giving adequate strength but that it does not contribute resilience to the pocket formed. The channel conveniently supplies one wall of the pocket.

It will be evident that the transfer from a somewhat rigid guide at the upper end of the arm to a resilient guide and ultimately a resilient holder below, which is universally adaptable to the stress lines throughout the required range, permits a simple and inexpensive, and at the same time rugged, construction for the body of the arm along with a highly effective resilient supporting and releasing mechanism at the tip.

The hinge-like movement about the bends 43 and 44 permits the slider to move bodily away from the pocket floor and also to rock about one edge of the slider while the opposite lip opens like a leaf.

Hinge-like swinging movement of the slider about one of the edges 44 allows the slider to rock about its edge at that side. Torsional movement of the slider about the edge 45 of the reinforcing plate allows the slider to swing in its entirety about that edge and movement of the spring side plate and reinforcing plate about the edge 46 of the stiffening plate at either side allows the slider to move bodily across the floor of the pocket. Any composite of these several movements can, of course, take place.

The different slider movements indicated are complicated moreover by permissible endwise movements of the slider, accommodated by a combination of depression of the tongue into the space 27 and leaf-like downward opening movement of the transverse lip 21, both permitting complete or partial downward release movement of the slider.

We have thus described a pick-up hook retaining and positioning device which loosely, and releasably, holds the hook in the proper pickup position and into which the hook may be readily inserted without being held by the operator at the time of insertion. Since the force with which the hook is removed from the arm occurs in a fraction of a second and may be from a variety of directions due to the flight path of the aircraft, its speed, and the angle of the arm with respect to the ground loop, it is most desirable that the retainer accurately position the hook with sufficient tension to insure its proper engagement with the loop and at the same time permit its ready and instant removal in any direction from which the removing force might be applied.

Having thus described our invention, what we claim as new and desire to secure by Letters Patent is:

1. In pick-up apparatus, a hook positioning and engaging assembly comprising a pick-up arm for an airplane having a track terminating short of the tip of the arm, a hook, guide means connected with the hook, said guide means adapted for non-releasable movement on said track and resilient walls supported by the arm forming a releasing pocket for the hook at the terminus of said track, said pocket being adapted to receive the hook as it passes from the track.

2. A pick-up arm having a track extending the greater part of the length of the arm, flanges upon the track, a hook, a slider rigid with the hook having interior guiding surfaces comprising grooves within the slider whose groove sides engage the track flanges, exterior guiding surfaces comprising shoulders on the slider, a pocket mounted on the arm formed by a yieldable spring end and yieldable spring side walls including lips for engaging the shoulders of the slider, and means for connecting a tow line to the hook.

3. A pick-up arm assembly for use in air pick-up systems having mounted thereon, a yieldable end wall, laterally mounted yieldable spring walls having inward limits of displacement with respect to each other, spring lips carried by the side walls, said walls and lips forming a recess at the lower end of the arm, a track secured to the arm and ending at a point above the edge of the resilient lips, a hook, and a track engaging member connected to the hook, said track engaging member being so dimensioned with respect to the track, the end wall, the inward limits of displacement of the side walls, and the resilient lips, that the track engaging member with hook attached travels down the track due to the force of gravity and drops into the recess.

4. A pick-up arm for attachment to an airplane, a guide on said arm leading from the attached end of the arm nearly to its tip, spring side walls forming a pocket at the tip end of the arm, said walls having spring sides, lips at a distance from the tip of said arm connected with the edges of the side walls to spring laterally with them, and a spring end for said pocket, a hook, and a slider connected with the hook, having facing and laterally extending grooves for engaging the guide, and outer shoulders engaged by the lips and adapted to be resiliently supported within the pocket and to be free to be withdrawn downwardly against the spring of the walls and at an angle to the length of the arm.

5. An air pick-up hook positioning and retaining device, comprising an arm, spring side plates attached near the tip of the arm and inwardly turned at their rear side edges, re-enforcing spring plates positioned against the spring side plates and terminating at a distance from the inwardly turned side spring edges to give lateral resilience greatest adjacent the inwardly turned spring edges, a yielding stop member positioned in spaced relation to the downward and rearward termini of the side plates and forming a pocket with said side plates, and a slider fitting into the pocket, the stop member, side and rear walls of the pocket yielding to stress through the slider to permit withdrawal of the slider endwise and diagonally with respect to the arm.

6. In air pick-up apparatus, as a combination, an airplane, a contact assembly comprising a pick-up arm on the airplane extending downwardly therefrom, a spring tongue attached longitudinally of the arm near its lower tip and having an outwardly extending restraining edge, a guard for the tongue forming a wall of a pocket at the end of the arm, spring side walls forming the sides of the pocket and having inwardly extending lips upon the side walls, a hook adapted for connection to a towing line, a hook-positioning member adapted to slide into the upper end of the pocket, said positioning member being resiliently restrained by the side walls and lips, and a guide for the positioning member on said arm directing it into the pocket.

7. A springy arm, a shell enclosing the arm at the upper end of the shell and there fastened to the arm and of inverted U section at the lower end of the shell, a tongue rigid with respect to the arm and having a rearwardly turned end extending across the yoke of the U section, a track fastened to the arm and to the shell, spring sides secured to the arm and to the shell and inwardly turned edges upon the spring sides, completing a pocket with resilient walls at the sides, rear and lower end thereof.

8. In pick-up apparatus depending downwardly and rearwardly from an aircraft, a pick-up arm, spring side plates secured near the end of the arm, adapted to be flexed away from the arm and also about axes parallel to the arm, lips at the trailing edge of the arm carried by the side plates, and a tongue secured to the arm between the side plates having a detent member adapted for movement transversely of the axis and also lengthwise of the axis of the arm.

9. An arm adapted to be supported by an aircraft in flight, a pick-up hook releasably positioned by said arm, a slider rigidly connected with the hook, spring sides for the slider mounted on the arm, laterally projected lips rigid with the spring sides, means for fastening the spring sides to the arm, said fastening means being located on the spring sides and longitudinally in line with the spring sides as distinguished from in line with the laterally projected lips, and supplemental springs for the spring sides re-enforcing the spring sides against lateral and torsional movement.

10. An arm adapted to depend from an aircraft in flight, a pick-up hook releasably positioned by said arm, a slider rigidly connected with the hook, spring sides for the slider attached to the arm, laterally projected lips rigid with the spring sides, means for fastening the spring sides to the arm, said fastening means being located on the spring sides and longitudinally in line with the spring sides as distinguished from in line with the laterally projected lips, a spring end attached to the arm for retarding the slide, the lips springing from the spring sides and also springing back bodily with the sides, and supplemental spring sides stiffening the spring sides against hinge-like movement and re-enforcing the spring sides against bodily outward movement away from each other.

11. In air-pick up apparatus, an arm secured to an aircraft, flanged guide means connected with the rear face of said arm and terminating above the tip of the arm, a hook, means on said hook for slidably cooperating with said guide means, and positioning means supported by said arm at the tip of the arm, said positioning means having resilient walls for engaging the outer surface of the hook as the guide means cease to cooperate with the hook.

12. In a hook positioning and retaining device for connecting a moving object with a relatively stationary object, a contact arm; a track on said arm; a hook; means on said hook for slidably cooperating with said track; and a sheath at the end of said track adapted to receive said hook and upon contact with a line release said hook, said sheath comprising a yieldable detent at the bottom of the sheath and against which the hook rests, and yieldable releasing spring sides partially enclosing the hook, said sides and detent permitting free entrance by the hook and restrained release.

13. In pick-up apparatus adapted to be supported by an airplane in flight, an arm extending downwardly and rearwardly from said aircraft, walls forming a resilient pocket on the lower portion of the arm, a rearwardly yielding spring tongue having a rearwardly extending and yielding spring end, a limiting floor member attached to the arm and supporting the tongue, said floor member limiting the travel of the tongue, yielding spring side plates adapted to fit against the floor member, inwardly turned lips on the side plates, said floor member, spring end, side plates, and lips forming said pocket on the lower portion of the arm, a hook adapted to be attached to a tow line, and a slider carried by the hook, fitting between the spring side plates, engaging the lips and spring end and adapted to be withdrawn diagonally endwise of the arm.

14. In a hook positioning and retaining device for air pick-up systems, a sheath for the hook constructed from a first yieldable side member, a second yieldable side member in opposite spaced relation to said first member, said side members having inwardly disposed lips, a yieldable detent having an end member, stiffening members for the side members, the side members and end member forming three sides of said sheath at the tip of an air pick-up arm.

15. In pick-up apparatus, an arm, a sheath on the end of the arm having spring side walls and a forward wall, lips connected with the trailing edges of the side walls partly closing the space between said trailing edges, and a spring detent mounted on the forward wall forming the end closure of the sheath.

ARTHUR B. SCHULTZ.
WILLIAM B. BURKHART.